United States Patent [19]

Ridge

[11] Patent Number: 5,192,049
[45] Date of Patent: Mar. 9, 1993

[54] DUAL RATED LIVE LOADED PACKING SYSTEM FOR A VALVE STEM

[75] Inventor: William A. Ridge, Inman, Kans.

[73] Assignee: Cashco, Inc., Ellsworth, Kans.

[21] Appl. No.: 897,864

[22] Filed: Jun. 12, 1992

[51] Int. Cl.[5] .................... F16K 41/02; B65D 53/00
[52] U.S. Cl. ................................ 251/214; 277/106
[58] Field of Search ............... 251/214; 277/102, 105, 277/106, 123

[56] References Cited

U.S. PATENT DOCUMENTS

| | | | |
|---|---|---|---|
| 534,575 | 2/1895 | Platts et al. | 277/106 |
| 548,089 | 10/1895 | Platts et al. | 277/106 |
| 601,614 | 3/1898 | Dudley | 277/106 |
| 2,441,705 | 5/1948 | Jacobsen | 277/106 X |
| 3,659,862 | 5/1972 | Sebastian | 277/106 |
| 3,713,660 | 1/1973 | Luthe | 277/206 R |
| 3,787,060 | 1/1974 | Astill et al. | 251/214 |
| 3,968,970 | 7/1976 | Vogeli | 277/106 |
| 4,061,157 | 12/1977 | Hanssen | 251/214 X |
| 4,582,329 | 4/1986 | Stalph | 277/106 |
| 4,722,507 | 2/1988 | Lindackers et al. | 277/102 X |
| 4,745,944 | 5/1988 | Francart, Jr. | 251/214 X |
| 4,773,442 | 9/1988 | Lephilibert | 277/106 X |
| 5,024,453 | 6/1991 | Suggs | 277/106 |
| 5,056,757 | 10/1991 | Wood | 251/214 |

Primary Examiner—John Rivell
Attorney, Agent, or Firm—Mason, Kolehmainen, Rathburn & Wyss

[57] ABSTRACT

A dual rated live loaded packing system for a valve stem includes at least one thrust load assembly extending between opposing facing elements on a valve body and a packing gland, respectively, for exerting a live load through a gland onto a packing ring contained in a packing chamber around the stem. The thrust load assembly includes an elongated tension member engaging a first one of the ears at one end and a second of the ears at an opposite end. An adjustable nut is threadedly engaged on the tension member having an end facing a surface on the second ear. A spring element is mounted on the tension member between the nut and the second ear for biasing the nut away from the second ear. A cylindrical spacer is mounted on the tension member enclosing the spring element for setting up a minimum value space between the nut and the second ear. A stop washer is mounted on the tension member between the end face of the nut and the ear and includes first and second opposite stop surfaces for selective engagement with a surface on the spacer to provide different thrust bias values between the ears depending on which of the first or second stop surface is aligned to face the second ear.

23 Claims, 2 Drawing Sheets

DUAL RATED LIVE LOADED PACKING SYSTEM FOR A VALVE STEM

BACKGROUND OF THE INVENTION

1. Field of the Invention

The present invention is directed towards a new and improved dual rated live loaded packing system for a valve stem and for a valve employing such system so that at least two ranges of thrust values may be provided to exert a live load on a packing ring around the valve stem. The packing system also provides a means to determine if the preferred or prescribed thrust values are being applied.

2. Background of the Prior Art

Over the years, a wide variety of piston rod packing systems, stuffing box sealing systems, valve stem sealing and piston ring sealing systems have been developed and some of these systems have utilized a live load thrust against a packing member to facilitate sealing around the piston rod or valve stem. U.S. Pat. No. 601,614 to Dudley; U.S. Pat. No. 3,659,862 to Sebastian; U.S. Pat. No. 3,713,660 to Luthe; U.S. Pat. No. 3,968,970 to Vogeli; U.S. Pat. No. 4,582,329 to Stalph; U.S. Pat. No. 4,722,507 to Lindackers et al. and U.S. Pat. No. 5,056,757 to Wood, disclose packing or stuffing box systems in accordance with the prior art.

OBJECTS OF THE INVENTION

It is an object of the invention to provide a new and improved dual rated live loaded packing system for valve stems, piston rods and rotating shafts and the like.

It is another object of the present invention to provide a new and improved valve employing a dual rated live loaded packing system.

Another object of the present invention is to provide a dual rated live loaded packing system of the character described which will also provide a means to detect when the desired load is not being applied.

Another object of the present invention is to provide a new and improved dual rated live loaded packing system of the character described in which the load rating can be easily and rapidly changed to a different value when required for different operating pressures.

Yet another object of the present invention is to provide a new and improved dual rated live loaded packing system of the character described which is relatively simple and straightforward in construction, relatively low in cost and exceptionally easy to maintain and change from one live load rating to another.

BRIEF SUMMARY OF THE PRESENT INVENTION

The foregoing and other objects and advantages of the present invention are accomplished in an illustrated embodiment thereof comprising a dual rated live loaded packing system for valve stems, piston rods, shafts and the like wherein a fixed and movable radially extending ear are interconnected through at least one loading assembly for exerting a live load on a packing ring through a packing gland. The loading assembly includes an elongated tension member having first and second ends, one of which is secured adjacent one of the ears with an adjustable nut threaded onto the member and facing the ear. A resilient spring in the form of a stack of "Bellville" type spring washers is mounted on the tension member inwardly of the adjustable nut and a spacer is provided to surround the stack of spring washers and set up a minimum spacing value between thrust elements. As an alternate tension member, a cap screw could be utilized. A stop washer is mounted on the tension member between the nut and the spacer, both of which may have opposed first and second stop surfaces for engagement with a cooperating surface of the other. Dependent upon which side of the stop washer is facing the ear, the value of the live load exerted on the packing ring is adjustable between two different value ranges and two different load values are possible by inverting the spacer. The presence of the prescribed thrust load can easily be determined by the tightness of the spacer. The spacer also serves as a guide for the spring elements.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 1:
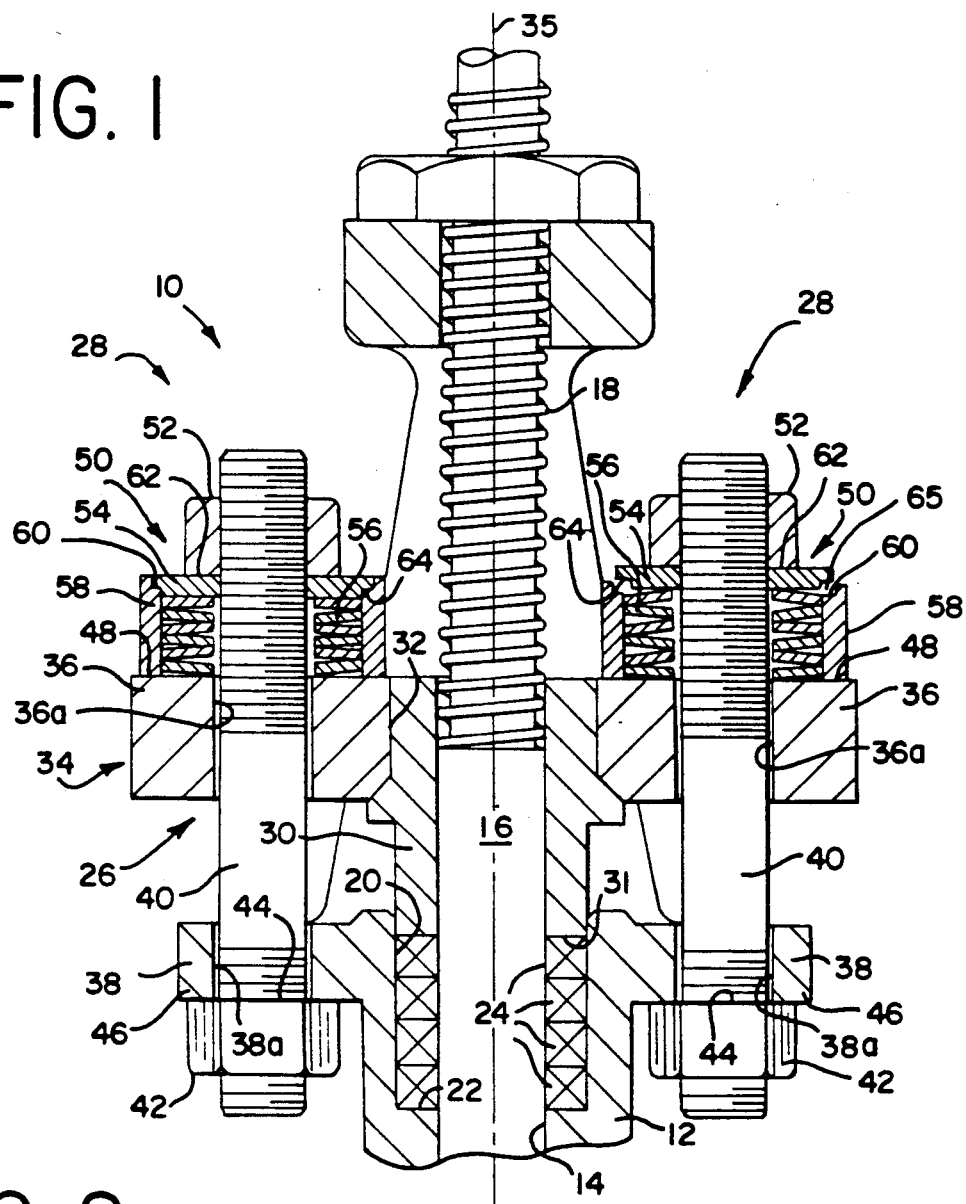
FIG. 1 is a longitudinal cross-sectional view of a new and improved dual rated live load packing system constructed in accordance with the present invention.

Referring now more particularly to the drawings, therein is illustrated a new and improved valve 10 constructed in accordance with the features of the present invention and including a valve body 12 having a cylindrical bore 14 adapted to contain an elongated stem 16 having a threaded segment 18 adjacent an upper end and rotatable within the bore when turned. The bore 14 is formed with an enlarged upper end portion having an annular shoulder 22 at an inward end thereof and the enlarged portion of the bore comprises a packing chamber 20 for containing one or a plurality of packing rings 24 in a stacked array. The packing rings 24 are formed of suitable packing material that is compatible with the fluid being handled in the valve 10.

The elongated stem 16 is rotatable and is longitudinally or axially displaceable in the bore 14 in packing chamber 20. A live loaded end thrust against an outer one of the respective packing rings 24 is adjustable in accordance with the present invention by means of a new and improved packing assembly generally indicated by the reference numeral 26 in FIG. 1. The packing assembly 26 including a plurality of dual rated, live load thrust assemblies 28 disposed equilaterally around a centerline or axis 35 of the stem 16 to exert a desired value of end thrust against the stack of packing rings 24 seated around the stem 16 within the packing chamber 20.

The packing assembly 26 includes a cylindrical packing gland 30 having a lower end portion extending downwardly into the packing chamber 20 with an annular lower end face 31 bearing against an uppermost packing ring 24 to urge the ring and stack of rings downwardly towards the fixed annular shoulder 22 of the chamber. The packing gland 30 projects upwardly through a central bore 32 of a radial thrust plate 34 having a plurality of radially outwardly extending ears or arms 36 in equilateral array around the central axis 35 of the valve stem 16. At the upper end of the valve body 12 there is provided a number of radially outwardly extending, integral ears 38 aligned with respective ears 36 of the thrust plate 34.

In accordance with the present invention, each thrust assembly 28 includes an elongated tension member 40 threaded at opposite end portions and extending through coaxially aligned bores 36a and 38a provided in aligned, respective pairs of upper, movable ears 36 and lower, fixed ears 38. On a lower threaded end portion, each tension bolt 40 is provided with an adjustable nut 42 having an upper thrust face 44 bearing against a lower face or thrust surface 46 on an ear 38.

Each upper ear 36 on the movable thrust plate 34 includes an upper thrust surface 48. Thus, each movable ear 36 and a respective aligned fixed ear 38 includes an upper thrust face 48 and a lower thrust face 46 spaced therefrom and in parallel, and both faces extend radially outwardly of and normal to the elongated axis 35 of the stem 16.

In accordance with the present invention, at the upper end of each thrust assembly 28 on a threaded upper end portion of the tension bolt 40 there is provided a dual rated resilient biasing assembly 50 for exerting a downward biasing force on the packing gland 30 against the stack of packing rings 24 contained in the packing chamber 20. Each dual rated resilient biasing assembly 50 includes an upper, adjustable thrust nut 52 threaded onto the tension bolt 40, a stop washer 54 intermediate the thrust nut and the upper thrust surface 48 and a stack of "Bellville" type, annular, spring washers 56 intermediate the underside of the stop washer 54 and the upper thrust surface 48.

Each stack of spring washers 56 is contained and enclosed generally within the inside wall surface of a cylindrical spacer 58 having a lower end seated on the upper thrust surface 48. The spacer 58 is formed with an internal annular groove 60 at the upper end adapted to confront and cooperate with opposite faces or stop surfaces on the stop washer 54. Each stop washer 54 has an outer diameter slightly less than the diameter of the groove 60 in the spacer 58 and is adapted to seat in the groove in either of two selected positions to provide a dual rated live loaded thrust capability. Each stop washer 54 is formed with a first stop surface comprising a flat or planar face 62 on one side and on the opposite side is provided with an annular groove 64 extending around a peripheral edge of the stop washer. The groove 64 forms a second stop surface parallel of the first stop face 62 and engageable with the lower surface of the groove 60 in the spacer 58.

Referring now specifically to FIG. 1, and to the right hand side of the centerline or axis 35, when the stop washer 54 is positioned with the flat stop face 62 facing upwardly, and with the downwardly facing surface of the annular edge groove 64 spaced at a level above the upwardly facing stop surface of the groove 60 on the spacer 58, this condition indicates that less than the desired compression or stress is being exerted on the packing rings 24 from the packing gland 30. Thus, the right hand portion of FIG. 1 clearly illustrates the thrust assembly 28 while operating in an insufficient thrust condition. In this condition, the vertical dimension between the upper thrust surface 48 on the ear 36 and the underside of the stop washer 54 is greater than the distance between the lower edge of the end of the spacer 58 and the upwardly facing surface of the groove 60. It should also be noted that a definite open space 65 exists between the confronting and facing grooves 60 and 64 of the stop washer 54 and spacer 58, respectively. This space 65 and the offset (mismatch) of the spacer 58 and washer 54 provide a visual indicator that adjustment is required. The looseness of the spacer 58 is a feature that displays the need to adjust by touch.

Referring now to the left hand side of FIG. 1, when the nut 52 is tightened to such an extent that the stop washer 54 is moved downwardly until the confronting grooves 60 and 64 of the stop washer and spacer 58 are tightly seated, then a maximum value of thrust or biasing force is exerted by the tension assemblies 28 on the packing gland 30 to provide a high value range of live loading for use in high pressure operation of the valve 10. It should be noted that in the fully tightened position as shown in the left hand side of FIG. 1, the nut 52 is tightened to such an extent that the spacer 58 will not readily turn and this provides a predetermined amount of preload biasing force or thrust on the tension member 40 of each thrust assembly 28 to afford a desired live load rating on the packing rings 24. Various load ratings may be provided by selecting different numbers and combinations of strength ratings in a stack of "Bellville" washers 56 or by a combination of different strengths of a stack of washers and selecting spacers 58 of different heights above the thrust surfaces 48.

The live loading packing system 26 in accordance with the present invention thus provides a maximum predetermined preload value (left hand portion - FIG. 1) or an insufficient load value (right hand portion - FIG. 1) for a desired value pressure rating when the stop washers 54 in each thrust assembly 28 are facing upwardly..

Figure 2:
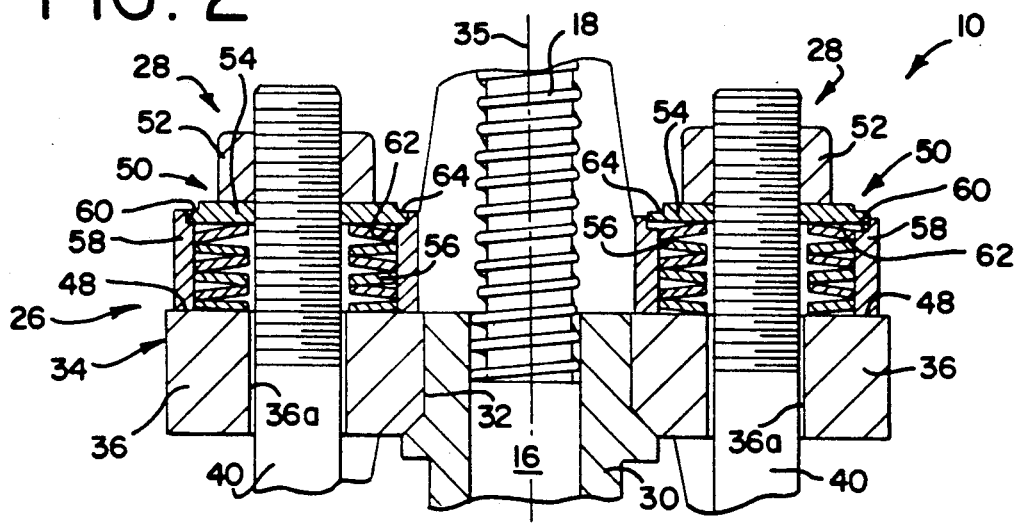
FIG. 2 is a fragmentary longitudinal cross-sectional view similar to FIG. 1 illustrating the packing system in another operating condition at a different load rating from that of FIG. 1.

In order to provide a second and lower value loading range without any changes to an existing stack of spring washers 56 being used, and thus provide an easily changeable dual live loading range capability, each thrust assembly 28 can be easily switched over by removing the nuts 52 from the upper threaded ends of the tension rods 40. After removal of the nuts, the stop washers 54 are turned upside down and remounted on the upper end portion of the tension rods 40 (as shown in FIG. 2) with the flat, stop surfaces 62 of the stop washers 54 facing downwardly (instead of upwardly) towards the thrust face 48 of each ear 36. In the downwardly facing position as shown in FIG. 2, the spacing distance between the flat face 62 of the stop washers 54 and the thrust surface 48 is slightly greater than before (FIG. 1) when the stop washers are positioned with the stop grooves 64 facing downwardly.

Referring specifically to FIG. 2 and the right hand side of the valve 10 towards the right of the centerline 35, the space 65 is noticeable both by the mismatch of the two mating parts, i.e., the washer 54 and the spacer 58 and by the looseness of the spacer 58 and this condition indicates that adjustment is required. However, when the nuts 52 are tightened down to the position as shown in the left hand side of the centerline 35 in FIG. 2, then a preload of a lower rated value of thrust against the packing rings 24 will be provided through the packing glands 30 as the nuts 52 are fully tightened so that the spacers 58 can no longer be turned by hand. The preload value of the thrust assembly 28 as illustrated on the left hand side in FIG. 2, is different and less than the preload value of the thrust assembly 28 as illustrated on the left hand side of FIG. 1, and thus a dual rated live load, biasing system is achieved with a reversal of the position of the stop washers 54 as described.

Figure 3:
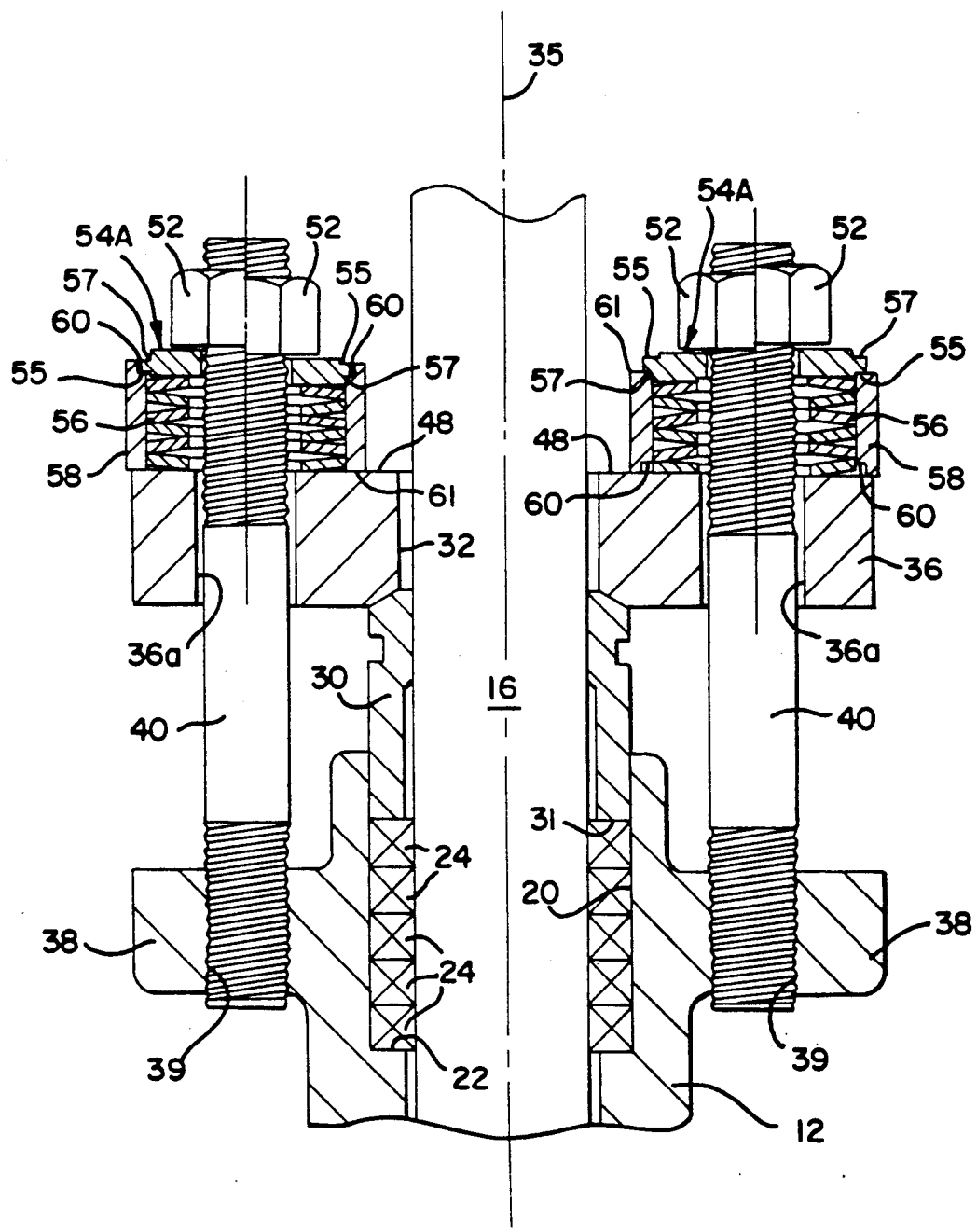
FIG. 3 is a fragmentary enlarged longitudinal cross-sectional view similar to FIG. 2, graphically illustrating a plurality of operating conditions, all having different thrust load values but using the same hardware.

Referring to FIG. 3, therein is illustrated another embodiment of the present invention, wherein a modified stop washer 54A is utilized having respective shallow and deep annular grooves 55 and 57, formed around the edge on opposite faces.

As illustrated in FIG. 3 on the left hand side of the centerline 35 and the left hand side of the tension stud 40, when the shallow stop groove 55 of the washer 54a is facing downwardly and seated against the groove face 60 of the spacer 58, one value of preloading obtains and when the stop washer 54A is turned over and facing in an opposite direction with the deep groove 57 seated against the spacer groove face 60 another value of preloading is provided.

As illustrated in FIG. 3 on the right hand side of the centerline 35, two additional values of preloading are provided by reversing the orientation of the spacer 58 so that a flat end face 61 opposite the groove 60 is available to engage the respective shallow and deep grooves 55 and 57 of the stop washer 54A.

From the foregoing it will be apparent that a total of four different preload values may be provided in the embodiment of FIG. 3 while utilizing the same number of component parts. In addition, the tension member 40 may be directly threaded into the ears 38 which are provided with a threaded bore 39. Also a fixed head bolt or cap screw can be used instead of a threaded stud 40 and separate nut 52.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A dual rated, live loaded packing system for a valve of the type including a stem extending into a packing chamber having an annular shoulder at one end around said stem and an open end for receiving a packing gland for exerting thrust toward said shoulder against a packing ring mounted in said chamber, said valve including a fixed ear extending radially of said stem and said gland including a movable ear confronting and movable toward and away from said fixed ear, the improvement comprising:

at least one loading assembly extending between said ears for exerting a live load on said packing ring through said packing gland;

said loading assembly comprising an elongated tension member having a first end secured to a first of said ears and a second end for resilient biasing engagement with a second of said ears;

said second end including adjustable nut means threadedly engaged on said tension member with a thrust face spaced from a thrust face on said second ear, resilient spring means mounted on said tension member between said thrust faces for biasing the same away from each other and spacer means mounted on said tension member between said thrust faces for setting up a minimum spacing between said thrust faces; and washer means mounted on said tension member between said nut means and said spacer means having opposed first and second stop surfaces for selectively engaging a surface on said spacer means to provide different biasing values between said ears dependent on which of said first and second stop surfaces is facing said thrust face on said second ear.

2. The packing system of claim 1, including:
a plurality of said loading systems spaced equilaterally around said stem.

3. The packing system of claim 1, wherein:
said spacer means comprises a cylindrical member enclosing said spring means having a first end engaged against one of said thrust faces and a second end adapted to be engaged with a selected one of said first and second stop surfaces of said washer means.

4. The packing system of claim 3, wherein:
said washer means includes a shoulder on a first face forming one of said stop surfaces thereof, and wherein
said spacer means includes a shoulder formed on said second end adapted to cooperate with said shoulder on said washer means for providing a first value of live loading.

5. The packing system of claim 4, wherein:
said washer means includes a second face opposite said first face for engaging said shoulder on said spacer means to provide a second value of live loading.

6. The packing system of claim 4, wherein:
said spacer means includes a recessed second shoulder opposite said first shoulder whereby a third and fourth value of live loading is available dependent on the relative positions of said spacer means and said washer means.

7. The packing system of claim 3, wherein
said spring means has a dimension measured along said tension member that is greater when said spring means is unstressed than the distance between said thrust faces when at least one of said stop surfaces of said washer means is out of engagement with said spacer means.

8. The packing system of claim 7, wherein:
said spring means is dimensioned to exert biasing force between said washer means and said one thrust face when said first and second stop surfaces are engaged with said spacer means.

9. The packing system of claim 3, wherein:
said spring means comprises a plurality of annular spring members around said tension member inside said cylindrical member and maintained in alignment thereby.

10. The packing system of claim 3, wherein:
said spring means comprises a stack of "Bellville" spring washers mounted on said tension member.

11. The packing system of claim 10, wherein:
said stack of "Bellville" washers in an unstressed condition has a dimension measured along said tension member greater than the dimension between said thrust faces when at least one of said stop surfaces of said washer means is out of engagement with said spacer means.

12. A valve including a live loaded packing system for a valve of the type including a stem extending into a packing chamber having an annular shoulder at one end around said stem and an open end for receiving a packing gland for exerting thrust toward said shoulder against a packing ring mounted in said chamber, said valve including a fixed ear extending radially of said stem and said gland including a movable ear confronting and movable toward and away from said fixed ear, said packing system comprising:

at least one thrust assembly extending between said ears for exerting a live thrust load on said packing ring around said stem through said packing gland;

said thrust assembly including an elongated tension member having a first end engaging a first of said ears and a second end engaging a second of said ears;

adjustable nut means threadedly engaged on said tension member having an end face spaced from said second ear;

spring means mounted on said tension member between said nut means and said second ear for biasing said nut means away from said second ear;

cylindrical spacer means mounted on said tension member between said nut means and said second ear for setting up a minimum value space between said nut means and said second ear; and stop washer means mounted on said tension member between said nut means and said second ear, said stop washer means having first and second stop surfaces on opposite faces for selectively engaging a surface on said cylindrical spacer means to provide different thrust bias values between said ears dependent on which of said first and second stop surfaces is facing said second ear.

13. The valve of claim 12, including:
a plurality of said loading systems spaced equilaterally around said stem.

14. The valve of claim 12, wherein:
said cylindrical spacer means surrounding said spring means and has a first end engaged against said second ear and a second end adapted to be engaged with a selected one of said first and second stop surfaces of said stop washer means.

15. The valve of claim 14, wherein:
said stop washer means includes an annular groove around the periphery on a first face forming one of said stop surfaces for engagement with said second end of said cylindrical spacer means.

16. The valve of claim 15, wherein:
said second end of said cylindrical spacer means includes an annular groove adapted to cooperate with said first and second stop surfaces on said stop washer means for providing different values of live loading.

17. The packing system of claim 15, wherein:
said spacer means includes a second shoulder opposite said first shoulder adapted to cooperate with said shoulder of stop washer means whereby a third and fourth value of live loading is available dependent on the relative positions of said spacer means and said washer means.

18. The valve of claim 16, wherein:
said stop washer means includes a flat second face opposite said first face forming said second stop surface for engaging said annular groove on said stop washer means to provide a second value of live loading greater than the live loading provided when said groove of said stop washer means is engaged with said groove of said cylindrical spacer.

19. The valve of claim 14, wherein:
said spring means has a dimension measured along said tension member that is greater when said spring means is unstressed than the distance between said thrust faces when at least one of said stop surfaces of said stop washer means is out of engagement with said spacer means resulting in looseness of said spacer means providing an indication that adjustment of said nut means is desirable.

20. The valve of claim 19, wherein:
said spring means is dimensioned to exert biasing force between said stop washer means and said one thrust face when said first and second stop surfaces are engaged with said spacer means.

21. The valve of claim 14, wherein:
said spring means comprises a plurality of annular spring washer members mounted on said tension member.

22. The valve of claim 14, wherein:
said spring means comprises a stack of annular spring washers mounted inside said spacer means.

23. The valve of claim 22, wherein:
said stack of spring washers in an unstressed condition has a dimension measured along said tension member greater than the dimension between said nut means and said second ear when at least one of said stop surfaces of said stop washer means is out of engagement with said spacer means resulting in looseness of said spacer means providing an indication that adjustment of said nut means is desirable.

* * * * *